No. 671,551. Patented Apr. 9, 1901.
W. S. HALSEY.
PISTON PACKING.
(Application filed Nov. 23, 1900.)
(No Model.)
FIG. I.
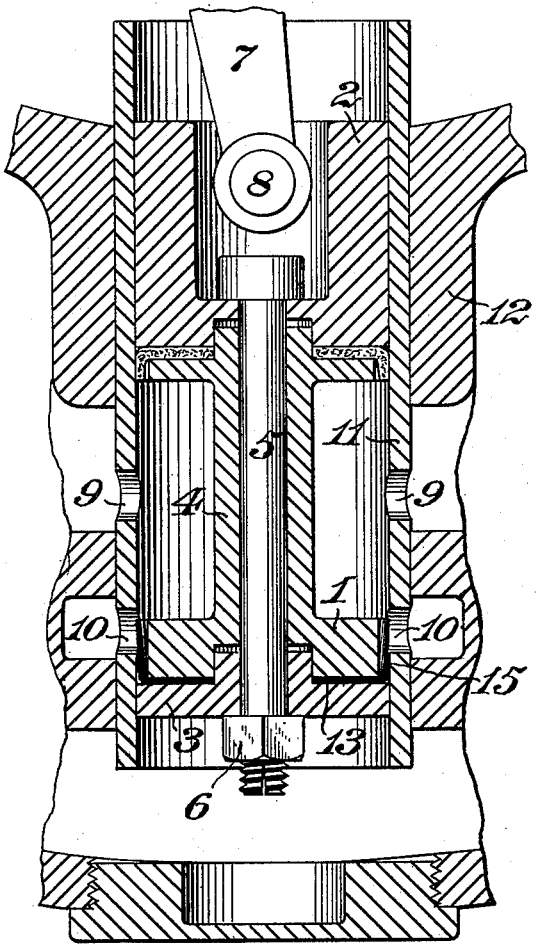
FIG. 2.
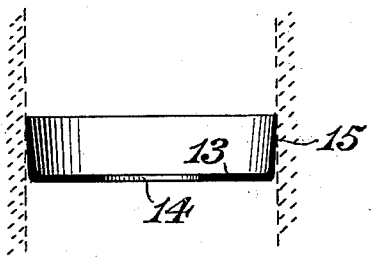
FIG. 3.
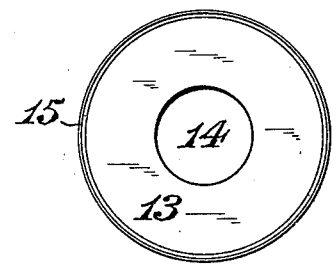
WITNESSES:
James C. Herron.
S. R. Bell.
INVENTOR,
William S. Halsey.
by Trowden Bell,
Att'y.

UNITED STATES PATENT OFFICE.

WILLIAM S. HALSEY, OF PITTSBURG, PENNSYLVANIA.

PISTON-PACKING.

SPECIFICATION forming part of Letters Patent No. 671,551, dated April 9, 1901.

Application filed November 23, 1900. Serial No. 37,483. (No model.)

*To all whom it may concern:*

Be it known that I, WILLIAM S. HALSEY, of Pittsburg, in the county of Allegheny and State of Pennsylvania, have invented a certain new and useful Improvement in Piston-Packing, of which improvement the following is a specification.

The object of my invention is to provide a piston-packing, designed more particularly for application in mechanisms in which compressed air or other high-pressure fluid is employed, by means of which a perfectly fluid-tight joint between a piston and the cylinder in which it operates may be insured without creating undue or excessive friction.

To this end my invention, generally stated, consists in an integral packing-cup in the form of a peripherally-flanged plate of elastic metal, the rim or periphery of which is drawn into slightly outwardly tapering or conical form and is adapted to be expanded against the bore of a cylinder when the packing-cup is fixed upon a piston by its own elasticity and by the pressure of the fluid in the cylinder.

The improvement claimed is hereinafter fully set forth.

In the accompanying drawings, Figure 1 is a longitudinal central section through the valve-chest and distribution-valve of a fluid-pressure motor, illustrating an application of my invention; Fig. 2, a transverse section through the packing-cup detached, and Fig. 3 an end view in elevation of the same.

My invention is herein shown as applied in connection with one of the piston-heads 1 of the distribution-valve of a fluid-pressure motor, said valve being composed of two end piston-heads 1 2, a follower 3 for the head 1, an intermediate central body 4, and a connecting-bolt 5 and nut 6. The valve is reciprocated by an eccentric-rod 7, coupled to a pin 8 on the head 2, and the head 1 controls ports 9 and 10 in a valve case or bushing 11, fixed in a casting 12, in proper relation to a motor-cylinder, which is not shown.

In the practice of my invention I provide either or both of the valve piston-heads (in the instance shown the head 1, which works over the ports 9 and 10) with a packing-cup formed of light sheet metal possessing a greater or less degree of elasticity—as soft steel, copper, or brass—said packing-cup being made by drawing a plate of such metal into the form of a body or disk 13, having a central opening 14 for connection to a piston-head and an integral unbroken rim or peripheral flange 15, the width of which is such as to provide the desired and determined area of bearing-surface on the bore of the cylinder or bushing 11 and which, in practice, is substantially equal to that of the piston-head 1. The rim 15 is drawn in slightly outwardly tapering or conical form, its end farther from the body being slightly greater in diameter than the bore of the valve-bushing, so that when fitted in operative position upon the connecting-bolt 5, between the head 1 and follower 3, and secured in such position by the nut 6 it will be expanded against the bore of the valve-bushing, primarily by the elasticity of the metal and further by the pressure of the motive fluid between the heads 1 and 2. The body of the packing-cup is held firmly between the piston-head and follower, and the expansion of the rim, due to its externally-tapering form, supplemented by the pressure upon it effects and maintains, as has been demonstrated in practice, a fluid-tight joint between the valve-piston and its cylinder or bushing and this without inducing excessive friction or undue resistance to the movement of the valve.

My invention will be found to be usefully and desirably operative under conditions in which packing of the snap-ring type would not be practicable, and the packing-cup having an unbroken rim which is sufficiently elastic to be pressed with proper force against the bushing to make a tight joint and sufficiently rigid to prevent it from being forced into port-openings the two objections of leakage and excessive friction are equally overcome in its operation. The packing-cup is simple and inexpensive and is readily applicable to pistons of any of the ordinary types without liability to leakage or displacement in service.

I claim as my invention and desire to secure by Letters Patent—

1. A packing-cup for pistons, formed of light sheet metal possessing elasticity, drawn into a body or disk and an unbroken rim integral with the body, and tapering outwardly from the body to a diameter slightly greater than that of the bore in which the piston is to operate.

2. The combination of a piston-head, a packing-cup of light sheet metal possessing elasticity, drawn into a body or disk fitting against one side of the piston-head and an integral unbroken rim surrounding said head, and tapering outwardly from the body to a diameter slightly greater than that of the bore in which the piston is to operate, and means for securing the packing-cup to the piston-head.

3. The combination of a piston-head, a follower, a packing-cup of light sheet metal possessing elasticity, drawn into a body or disk which is interposed between the piston-head and follower and an integral rim surrounding the piston-head, and tapering outwardly from the body to a diameter slightly greater than that of the bore in which the piston is to operate, and means for connecting the piston-head and follower.

WILLIAM S. HALSEY.

Witnesses:
J. SNOWDEN BELL,
CLARENCE A. WILLIAMS.